Figure 1:
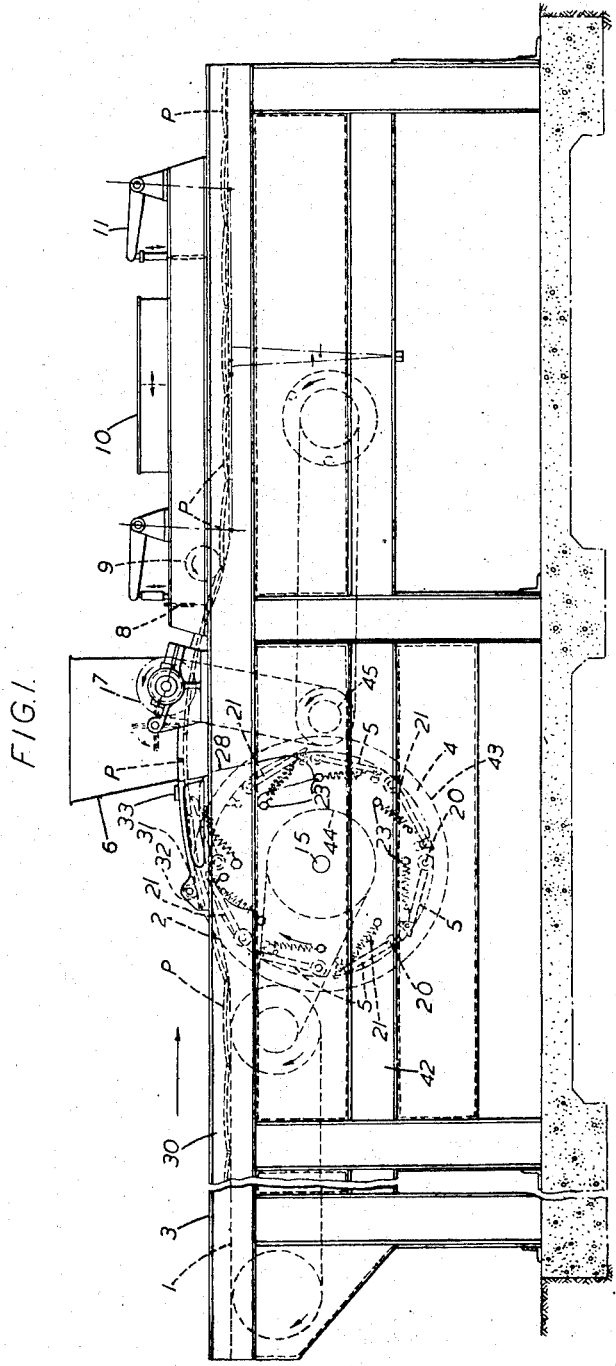

Aug. 26, 1952     D. J. DAVIDSON     2,608,285
PALLET FEEDING DEVICE

Filed Feb. 21, 1948     5 Sheets-Sheet 1

Inventor
DONALD J. DAVIDSON
By Jerome W. Paxton
Agent.

Aug. 26, 1952     D. J. DAVIDSON     2,608,285
PALLET FEEDING DEVICE
Filed Feb. 21, 1948     5 Sheets-Sheet 3

FIG. 3.

Inventor
DONALD J. DAVIDSON
By Jerome W. Paxton
Agent.

Aug. 26, 1952   D. J. DAVIDSON   2,608,285
PALLET FEEDING DEVICE
Filed Feb. 21, 1948   5 Sheets-Sheet 4
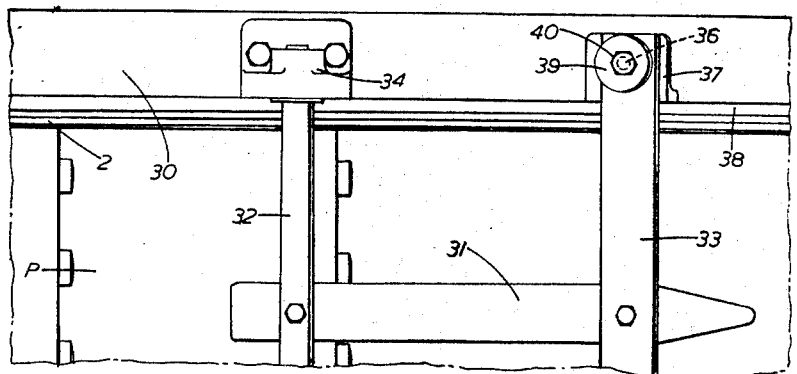
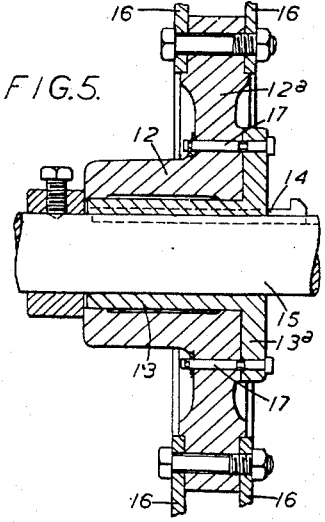
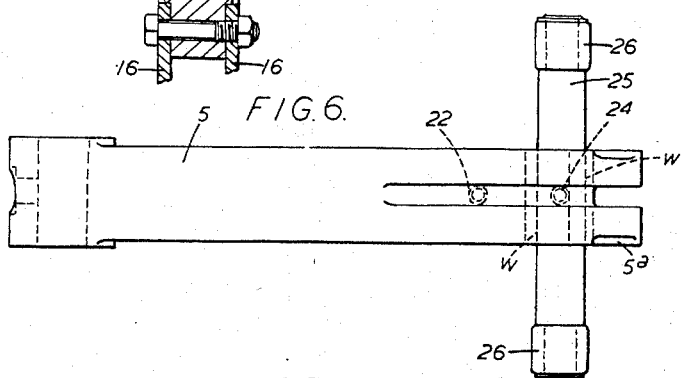
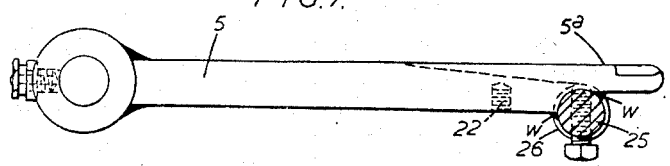
Inventor
DONALD J. DAVIDSON
By
Jerome W. Paxton
Agent.

Aug. 26, 1952     D. J. DAVIDSON     2,608,285
PALLET FEEDING DEVICE
Filed Feb. 21, 1948     5 Sheets-Sheet 5
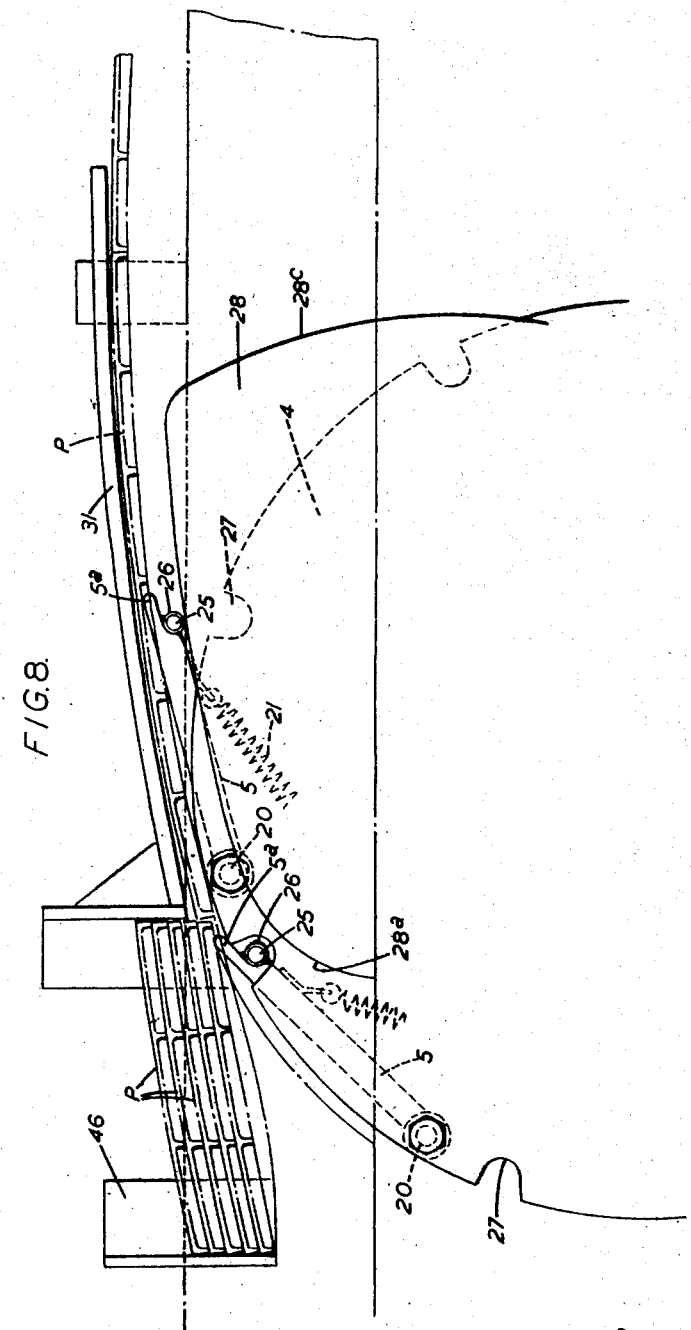
Inventor
DONALD J. DAVIDSON
By
Jerome W. Paxton
Agent.

Patented Aug. 26, 1952

2,608,285

UNITED STATES PATENT OFFICE 2,608,285

PALLET FEEDING DEVICE

Donald John Davidson, Ravenstone, England, assignor to Pegson Limited, Coalville, England, a British company Application February 21, 1948, Serial No. 10,057
In Great Britain February 9, 1945

Section 1, Public Law 690, August 8, 1946
Patent expires February 9, 1965

4 Claims. (Cl. 198—25)

This invention appertains to machines for making roofing and other tiles of concrete, mortar and like cementitious materials, and concerns machines of the type wherein the tiles are formed upon pallets which are carried or passed mechanically in succession under the tile forming means of the machine.

The principal object of this invention is to provide a tile making machine of the type herein referred to furnished with an improved form of driving means for imparting the forward movement to the pallets. The improved driving means impart to the pallets in end-to-end contact a continuous forward movement which takes place at a speed which is substantially constant. The continuous forward movement of the series of pallets in end-to-end contact causes said pallets to pass under the tile forming means, in a stream.

The tile making machine constituting this invention includes, in combination, tracks for supporting and guiding the pallets as they pass to the tile forming means, and driving mechanism for imparting to the said pallets continuous forward movement so that they are pushed along the pallet-supporting tracks past the tile forming means in end-to-end contact in a series or stream, said mechanism comprising a rotary wheel, disc or like driving member located beneath the tracks at a location spaced from the tile forming means in the direction of travel of the pallets, and pawls which are pivoted on the said member and arranged to engage the pallets one after another.

With this driving mechanism, motion is transmitted by the pawls on the rotating wheel, disc or like driving member to the pallets so that they move forward one after another rectilinearly or substantially so along the supporting and guiding tracks and are pushed forward pallet to pallet in an unbroken series through the machine.

Figure 2:
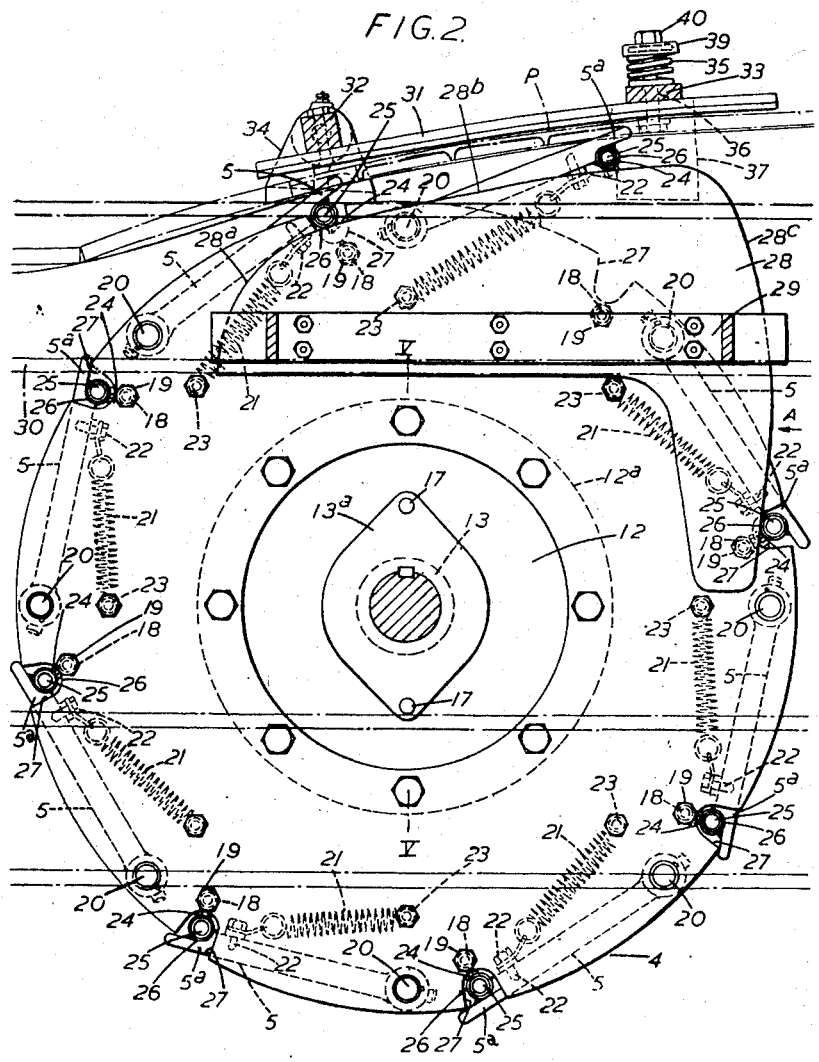

A specific example of the improved pallet-driving mechanism embodied in a tile making machine of the type concerned will now be described with reference to the accompanying drawings, wherein:

Figure 1 is a general schematic side view of the said machine showing the application thereto of the rotary pallet-driving member, Figure 2 is an enlarged side view of the said member, showing also one of the associated pawl-controlling cams and the thrust bar, Figure 3 is an end or edge view of the rotary pallet-driving member as viewed in the direction of the arrow A in Figure 2, with some of the associated parts of the machine shown in section, Figure 4 is a detail plan view of the aforesaid thrust bar, Figure 5 is a detail cross-sectional view, taken on the line V—V of Figure 2, showing the axle hub assembly of the pallet-driving member, Figure 6 is a plan view of one of the pawls, per se, Figure 7 is a side view of the same, with the guide roller axle shown in section, and Figure 8 is a detail side view of so much of the improved driving mechanism as is necessary to illustrate its application to a tile making machine wherein the pallets are stacked one above another in a magazine or hopper as will be hereinafter described.

Like parts are designated by similar reference characters throughout the drawings.

In the machine illustrated schematically in Figure 1 the pallets P are supplied by hand or from a return conveyor to a feed conveyor 1 of the endless belt type. This feed conveyor delivers the pallets P one behind another in endwise contact to supporting guide tracks 2 on the sides of the machine frame or bed 3 along which the pallets slide and so that they pass over a rotary driving member designated generally by the numeral 4. The said driving member is of the improved form hereinbefore described, being furnished with pivoted pawls 5 by which the pallets P are driven forward and pushed, pallet to pallet, along the supporting guide tracks 2. As they are driven forward the pallets pass under the tile forming means which comprise a mortar box 6, compressing unit 7, a vertically movable severing knife 8, a rotary cutter 9, a reciprocating colour or topping box 10 and a punch 11. Such tile forming means, which are spaced from the rotary driving member 4 are of known construction and form no part of the present invention. The feed conveyor 1 operates with a surface speed greater than that of the pallets P passing through the machine so as to ensure the pallets passing to the rotary driving member 4 in contact with each other.

The rotary driving member comprises a circumferentially flanged hub 12 which is attached to a flanged bush 13 adapted to be keyed at 14 to a driven shaft 15, the hub flange 12a having rigidly attached to each of its side faces a circular flat side plate 16.

The bush 13 is secured within the hub 12 by fastening elements 17 which are passed right through the flanged portion 13a of the bush and the hub flange 12a. Bolts are preferably employed for the attachment of the side plates to the hub flange.

The two side plates 16, moreover, are laterally spaced apart by the interposed flange 12a and also by tubular distance pieces 18 located near the periphery and equally spaced apart circumferentially and secured in position by transverse bolts 19 passed through the plates. The pawls 5 are situated between the plates 16 (see Figure 3) near the periphery thereof, each pawl being mounted upon a transverse pivot pin 20 passed through the plates and suitably secured. As shown in Figure 2, the pawl pivot pins 20 are disposed equidistantly around the plates 16 and the free ends 5a of the pawls are arranged to swing outwards from the periphery of the said plates. Each pawl is controlled by a tension spring 21 one end of which is attached to the inside of the pawl at 22, the other end of the spring being held by a transverse bolt or pin 23 passed through the plates. The springs 21 draw the pawls 5 inwards and hold them in a normal retracted position. To enable its normal position to be determined and adjusted, each pawl, as shown clearly in Figure 7, has a screw 24 projecting from the inside near its free end 5a and when the pawl is retracted by its controlling spring the said screw makes contact with a stop which limits its inward movement. Conveniently, and as shown in Figure 2, the tubular distance pieces 18 are suitably positioned to serve as stops for pawl screws 24. By turning its screw 24 the normal position of a pawl can be varied if and when necessary. Each pawl has secured to it, e. g. by welding w (Figures 6 and 7), near its free end 5a a transverse axle 25 which projects laterally on opposite sides of the pawl and, mounted in a freely rotatable manner upon each end of the axle, is a guide roller 26. The free end 5a of each pawl terminates in a rounded tip of suitable formation for engagement with the pallets for the purpose of pushing them along as hereinbefore described. The peripheries of the side plates are formed with notches 27 at suitable places to accommodate projecting ends of the axles 25 when the pawls 5 occupy their normal retracted positions. The pawls can be set to occupy a normal position wherein their tips project to a suitable extent to enable them to make contact with the pallets. The guide rollers 26 are adapted to bring upon the edges of a pair of facsimile cams 28 located in a suitable position one on either side of the rotary driving member 4, these cams being fixed to brackets 29 secured to side frame members 30 (Figure 3) and having edges of appropriate profile to control the movements of the pawls as previously described herein. That is to say, the cams 28 have portions 28a for moving the pawls outwards into pallet engaging position, portions 28b for maintaining the said pawls in the engaging position for driving forward the pallets P, and portions 28c for controlling the pawls in their return to normal position.

At the locality where the pawls 5 engage the pallets P, there is a thrust bar 31 disposed longitudinally and centrally over the line of pallets for holding the latter down against upward thrust of the pawls acting thereon. As will be seen in Figures 2, 3 and 4, the rear end of the bar 31 is pivotally mounted at a point situated over the driving member 4 from which point the bar extends forward and has its front end arranged under adjustable spring pressure. At its rear (pivoted) end the bar is so held as to allow ample space for the pallets to pass beneath it but at its front end it is pressed down into contact with the pallets by the spring means. As the pallets P are moved forward by the action of the feed conveyor 1 they pass under the rear end of the thrust bar 31 and gradually come into contact with the underside thereof as they are advanced by the action of the rotary driving member and have to force their way under the front end of said thrust bar which is pressed into contact with their upper faces. The thrust bar 31 therefore also acts as a brake upon the stream of pallets for the precise purpose hereinafter set forth. As will be seen in Figures 2, 3 and 4 the thrust bar 31 is attached at or near its rear and front ends to transverse bars 32 and 33 respectively, which bars extend to the side frames of the machine. The bar 32 has its ends reduced and pivoted in bearing brackets 34 secured upon the uppermost faces of the side frame members 30, and the other transverse bar 33 has its ends acted upon by compression springs 35 arranged on bolts 36 carried by angle brackets 37 bolted to upward extensions 38 of the said side frame members. The bolts 36 are furnished with nuts 40 and washers 39 by which the spring pressure on the transverse bar 33 can be varied if required. For controlling comparatively narrow pallets a single thrust bar such as that illustrated may be used, but for wider pallets, there may be two or more of such thrust bars to which the transverse bars and springs are common.

Now the mortar compressing unit 7, when functioning in the proper manner, offers resistance to the forward passage of the pallet stream underneath it and it is this resistance that the rotary driving member 4 has to overcome in order to keep the pallet stream moving. In the event of the mortar box 6 becoming empty the resistance to the forward movement of the pallet stream ceases or at least becomes much reduced in which case the before mentioned greater speed of the feed conveyor 1 might cause the whole pallet stream to move forward at a greater rate than that at which the pawls 5 are timed to act upon the pallets for driving them, and such increase of rate of travel of the pallet stream would not only put the pallets out of "mesh" with the driving pawls but would also bring them out of register with moving parts of the tile forming means such as the severing knife 8, colour box 10 and punch 11. It is to obviate such overrun of the pallet stream that the thrust member 31, in addition to its primary function of holding down the pallets, is adapted to act as a brake.

As shown in Figure 3, the shaft 15 is mounted in bearings 41 supported by further side frame members 42. At the appropriate end the shaft 15 has secured thereto a gear wheel 43 to which is attached a chain sprocket 44. The conveyor 1 is driven from this sprocket by a suitable chain drive, and the gear wheel 43 is arranged in mesh with a pinion 45 (see Figure 1) from which the mortar compressing unit 7, the knife 8, the reciprocating colour box 10 and the punch 11 of the tile forming means may conveniently be driven in timed relation to the rotary driving member.

In another application of the invention to a tile making machine the rotary driving member 4 may, as shown in Figure 8, be arranged to take the pallets P one at a time from a magazine or hopper 46 wherein the pallets are stacked one above another. In this machine the magazine 46 is positioned so that the projecting tips 5a of the pushing pawls 5 on the rotary driving member 4 can, as they come up, enter the bottom of the magazine and make contactual engagement with the recurrent bottom pallets and push them out of the magazine and into the supporting guide tracks of the machine. Each pawl pushes out a pallet so that the pallets are taken one at a time from the stack and formed into a continuous series wherein they are in endwise contact and are caused by the driving member to pass in this condition through the machine.

The invention may be applied to a machine wherein pallets of single tile width or pallets of two, three or four tile width are used. For driving the narrower pallets, a single rotary driving member may suffice in which case it is arranged so that its pawls engage the pallets in the centre, i. e. midway of their width, as illustrated in the drawings. For driving the wider pallets it may be desirable to provide two of the rotary driving members on the same driving shaft in which case the said driving members will be arranged so that their pawls will engage the pallets simultaneously at two different points equidistant on opposite sides of the centre line of the pallets so that the thrust for driving the pallets forward will be applied by the two pawls jointly. The invention should therefore be understood as covering a single rotary driving member or more than one of such members for driving the pallets in a stream through the machine. Or instead of using more than one driving member for driving the wider pallets, a single driving member having pairs of pawls suitably spaced apart laterally thereon may be used. The spaced apart pawls in each pair would be so arranged as to engage the pallet simultaneously and act conjointly to push it forward.

The invention is applicable to tile making machines for making single or double cambered tiles e. g. Broseley tiles, interlocking tiles, pantiles, floor tiles, wall tiles and the like. The pallet driving means herein described can be used for different kinds of pallets.

The pawl tips 5a have a rolling action during engagement with the pallets and are thus subjected to but little wear. If desired the pawls may carry renewable tips of hard steel so as to reduce replacement costs. The advantages of having the series of pallets pass under the tile forming means with a continuous movement are that a higher output can be obtained, the smoother action of the machine is conducive to the production of better tiles and the power required is considerably reduced.

What I claim then is:

1. In a tile making machine provided with tracks for supporting and guiding a series of pallets during movement of the pallets past a tile forming means, driving mechanism for imparting continuous forward movement to the pallets so that the pallets are pushed along the tracks in end-to-end contact at nearly uniform velocity, the said driving mechanism comprising a continuously rotatable shaft, a rotary member carried by said shaft and located beneath the pallet-supporting tracks, a plurality of pawls spaced apart equidistantly around the rotary member pivoted to the rotary member and movable outwardly and inwardly on their pivots, stops located at the periphery of the rotary member to determine the normally retracted positions of the pawls with the forward tips of the pawls projecting beyond the periphery of the rotary member, spring means connected with the pawls and holding the pawls in the normally retracted positions, rollers on the pawls, fixed edge cams for action on the rollers to control the pawls during outward and inward movement of the pawls, and a spring-controlled thrust bar disposed longitudinally and centrally over the line of pallets, the arrangement being such that as each pawl in turn moves into its operating range, the pawl is caused to swing outwardly against the action of its spring by said cam to position said pawl for engagement with a moving pallet whereby the pallet is impelled forwardly by the said pawl whereafter as the drive is taken up by and the load transferred without shock to, the next following pawl, the leading pawl will be released and moved inwardly to its normal retracted position by its spring means under the control of the cam, the spring-controlled thrust bar serving to hold the pallets down against the upward thrust of the pawls acting thereon.

2. In a tile making machine provided with tracks for supporting and guiding a series of pallets during movement of the pallets past a tile forming means, driving mechanism for imparting continuous forward movement to the pallets so that the pallets are pushed along the tracks in end-to-end contact at nearly uniform velocity, the said driving mechanism comprising a continuously rotatable shaft located at a point beneath the pallet-supporting tracks, a circumferentially flanged boss carried by said shaft, laterally spaced circular side plates attached to the side faces of the flange, said side plates having equidistantly spaced notches in their peripheries, the flanged boss and the side plates together constituting a rotary driving component, a plurality of pawls pivoted between the side plates and movable outwardly and inwardly on their pivots, distance pieces between said side plates at the periphery thereof serving also as stops for contact with the pawls to determine the normally retracted positions of the pawls with the forward tips of the pawls projecting beyond the said peripheries, springs connected with the pawls normally holding the pawls in their retracted positions, a transverse axle secured in and projecting laterally on opposite sides of each pawl, rollers mounted on the projecting ends of each transverse axle, a pair of fixed facsimile cams located on opposite sides of the rotary driving component and presenting edges upon which said rollers ride, and a thrust member located over the line of the pallets with the rear end thereof mounted at a point over the rotary driving component from which point it extends forwardly and has its forward end arranged for action yieldingly upon the pallets, the arrangement being such that as each pawl in turn moves into its operating range, the cams cause the pawl to move outwardly against the action of its spring to position the pawl for engagement with a pallet in motion whereby the pallet is impelled forwardly by said pawl, whereafter as the drive is taken up, and the load transferred without shock to, the next following pawl, the leading pawl will be released and move inwardly to its normal retracted position by its spring under the control of the cams, the axles of the retracted pawls resting in the notches in the side plates and the front thrust member to hold the pallets down against the upward thrust of the pawls acting thereon.

3. In a tile making machine provided with tracks for supporting and guiding a series of pallets during movement of the pallets past a tile forming means, driving mechanism for imparting continuous forward movement to the pallets so that the pallets are pushed along the tracks in end-to-end contact at nearly uniform velocity, the said driving mechanism comprising a continuously rotatable shaft located at a point beneath the pallet-supporting tracks, a rotary member fixed to said shaft for movement therewith, a plurality of spaced apart pawls pivoted to said rotary member for movement outwardly and inwardly respecting said rotary member, means disposed at the periphery of said rotary member for contact with the pawls to determine the normally retracted positions of the pawls with the free ends of the pawls projecting beyond the periphery of the rotary member, spring means operatively connected with said pawls for holding the pawls in the normally retracted position, fixed edge cams located in the path of the free ends of the pawls for action on the pawls to control the same during outward and inward movement of the pawls, and a spring-controlled thrust bar disposed longitudinally and centrally over the line of pallets, the arrangement being such that as each pawl moves into its operating range, the pawl is caused by the cam to move outwardly against the action of its spring means to position said pawl for engagement with a moving pallet whereby the pallet is impelled forwardly by the said pawl, whereafter as the drive is taken up by, and the load transferred without shock to, the next following pawl, the leading pawl will be released and caused to move inwardly to its normal retracted position by its spring means under the control of the cam, the thrust bar serving to hold the pallets down against upward thrust of the pawls acting thereon.

4. In a tile making machine provided with tracks for supporting and guiding a series of pallets during movement of the pallets past a tile forming means, driving mechanism for imparting continuous forward movement to the pallets so that the pallets are pushed along the tracks in end-to-end contact at nearly uniform velocity, the said driving mechanism comprising a continuously rotatable shaft located beneath the pallet-supporting tracks, a pair of laterally spaced circular side plates operatively connected to said rotatable shaft, means extending between the side plates at the peripheries thereof for maintaining said plates in spaced relation, the said side plates having equidistantly spaced notches in their peripheries, the means operatively connecting the side plates to the rotatable shaft and the side plates constituting a rotary driving component, a plurality of pawls pivoted between the side plates and movable outwardly and inwardly on their pivots, the means maintaining the side plates in spaced relation also serving as stops for contact with the pawls for determining the normally retracted positions, the free ends of the pawls projecting beyond the peripheries of the side plates, spring means connected to each pawl and the side plates for normally holding the pawls in their normally retracted positions, a rotatable element secured to and extending laterally on opposite sides of each pawl, a pair of fixed facsimile cams located on opposite sides of the rotary driving component and presenting edges upon which the laterally projecting rotatable element of each pawl rides, and a spring-controlled thrust bar disposed longitudinally and centrally over the line of pallets, the arrangement being such that as each pawl in turn moves into its operating range, the cams cause the pawl to move outwardly against its spring means to position the pawl for engagement with a moving pallet whereby said pallet is impelled forwardly by the pawl whereafter as the drive is taken up by, and the load transferred without shock to, the next following pawl, the leading pawl will be released and caused to move inwardly to its normally retracted position by the action of its spring means under the control of the cams, the rotatable elements of the retracted pawls resting in the notches in the side plates and the thrust member serving to hold the pallets down against the upward thrust of the pawls acting thereon.

DONALD JOHN DAVIDSON.

REFERENCES CITED

The following references are of record in the file of this patent:

UNITED STATES PATENTS

| Number | Name | Date |
|---|---|---|
| 466,763 | Barnes | Jan. 12, 1892 |
| 1,418,227 | Brock | May 30, 1922 |
| 1,695,327 | Goldston | Dec. 18, 1928 |
| 1,900,625 | Walker | Mar. 7, 1933 |
| 1,921,003 | Romie | Aug. 8, 1933 |
| 1,974,931 | Rose | Sept. 25, 1934 |
| 1,977,374 | Brooke et al. | Oct. 16, 1934 |

FOREIGN PATENTS

| Number | Country | Date |
|---|---|---|
| 445,056 | Great Britain | Apr. 2, 1936 |